United States Patent Office 2,839,432
Patented June 17, 1958

2,839,432

WASHABLE WALLPAPER COATINGS

Martin Salo and Harold F. Vivian, Rochester, N. Y., assignors to Eastman Kodak Company, Rochester, N. Y., a corporation of New Jersey No Drawing. Application June 17, 1954
Serial No. 437,564

4 Claims. (Cl. 117—155)

This invention concerns washable wallpaper, more particularly it concerns washable wallpaper coated with a lacquer having a cellulose acetate butyrate base.

The requirements for washable wallpaper have been very stringent due to the necessity of being able to remove various items from the wallpaper using soap and water or in extreme cases with an easily available solvent such as turpentine. Consequently, it has been extremely difficult to find a coating which could be applied to all types of paper base and which would provide a suitable surface from which such materials as cooking greases and oils, furniture polish, shoe polish, lipstick and the like could be removed easily. Moreover, the coating should have a dull or flat finish for most applications and cause no difficulties in its application. It is important that the coating should not impart an undesirable curl to the paper and make it difficult to handling in hanging. Excessive curl is obviated by the incorporation of a suitable plasticizer to the lacquer.

An object of this invention is to provide a washable wallpaper. Another object of this invention is to provide a washable wallpaper from which can be removed such stains as cooking greases and oils, furniture polish, shoe polish, lipstick, inks, crayons, cosmetics, food, and beverages. An additional object of this invention is to provide a dull or flat finish washable wallpaper which can be applied readily. Another object is to provide a lacquer which may be applied to wallpaper which will give a surface which can be easily cleaned in order to remove stains. An additional object is to provide a lacquer which may be applied to wallpaper after it has been installed on the walls.

We have discovered that the above objects can be obtained with a cellulose acetate butyrate lacquer containing certain components in critical proportions. If a non-shiny or dull coating is desired, a flatting agent must be incorporated which may be of a material such as silica aerogel or a diatomaceous earth. An alkyd plasticizing resin is also incorporated in the lacquer composition to eliminate curl but must be selected from those resins having particular solubility characteristics. A suitable solvent mixture comprises toluene, acetone, ethyl alcohol and naphtha. However, the solvent constituents may be varied and substituted to provide other solvent mixtures which will put all the various elements of the lacquer into solution.

We have found that from 60 to 75 percent cellulose acetate butyrate must be used, having a butyryl content of above about 35 percent and an acetyl content of from 5 to 18 percent. The flatting agent should be from 5 to 15 percent if desired for a dull finish, while the alkyd plasticizing resin should be added from 5 to 25 percent, depending upon the weight of the stock upon which the lacquer is to be coated.

The alkyd plasticizing resin is provided by the reaction of 1,2-propylene glycol with adipic acid. The color of the alkyd plasticizing resin must be water-white or a very light color which will not show in the resulting lacquer. The acid number must not exceed 2.0. Moreover, the resin should be readily soluble in esters, ketones, aromatic hydrocarbons and chlorinated hydrocarbons. It should have only limited solubility in ethanol and diethyl ether and should not be soluble in mineral thinner or ethylene glycol.

The following table shows the results of our preferred embodiment when stained with lard, Wesson oil, black ink, black pencil, and the like.

Table 1

| No. | Percent cellulose acetate butyrate | Percent silica aerogel | Percent alkyd plasticizer resin | Solvent¹ solid ratio | Lard |  | Wesson oil |  | Black ink |  | Black M pencil |  | Red indelible pencil |  | Steko wallpaper paste |  | Lipstick |  | General comments |
|---|---|---|---|---|---|---|---|---|---|---|---|---|---|---|---|---|---|---|---|
|  |  |  |  |  | Hrs. | Mos. | Hrs. | Mos. | Hrs. | Mos. | Hrs. | Mos. | Hrs. | Mos. | Hrs. | Mos. | Hrs. | Mos. |  |
|  |  |  |  |  | 6 24 72 | 5 | 6 24 72 | 4 | 6 24 72 | 5 | 6 24 72 | 5 | 6 24 72 | 5 | 6 24 72 | 5 | 6 24 72 | 5 |  |
| 1 | 67 | 13 | 20 | 6:1 | +++ | − | +++ | − | +++ | − | +++ | − | −−− | − | −−− | − | +++ | − | Flat, dull coating. |
| 2 | 67 |  | 23 | 7:1 | +++ | − | +++ | − | +++ | − | +++ | − | −−− | − | −−− | − | +++ | − | Flat, glossy coating. |
| 3 | 73 | 5 | 22 | 7:1 | +++ | − | +++ | − | +++ | − | +++ | − | −−− | − | −−− | − | +++ | − | Flat, sl. dull coating. |
| 4 | 70 | 9 | 21 | 7:1 | +++ | − | +++ | − | +++ | − | +++ | − | −−− | − | −−− | − | +++ | − | Flat, dull coating. |
| 5 | 73 | 5 | 22 | 7:1 | +++ | + | +++ | + | +++ | + | +++ | + | +++ | + | +++ | + | +++ | − | Do. |
| 6 | 70 | 9 | 21 | 7:1 | +++ | + | +++ | + | +++ | + | +++ | + | +++ | + | +++ | + | +++ | − | Do. |

¹ 48% toluene, 24% acetone, 20% #1 alcohol, 8% #1 naphtha.
The cellulose acetate butyrate used contained at least 35% butyryl and from 5 to 18% acetyl. The intrinsic viscosity varied from 0.5 to 2.0 in acetone.

The solvent to solid ratio may be varied depending upon the means of application, brush, spray, dipping or the like.

We have discovered a lacquer which may be coated by the manufacturer on the wallpaper before it is sold and hung on the walls. Moreover, our lacquer can be applied to wallpaper by the home owner after the wallpaper has been hung on the walls and suitably dried. As a result of the adaptability of our invention, wallpaper can be protected in places where it shows the greatest amount of wear or where it is liable to be subject to stains with greater frequency. Our lacquer could also be applied to other paper objects wherein a washable surface is found desirable such as on book covers, paper lamp shades and the like. Our lacquer should prove to be of great value to the home owner or handyman around the house who wishes to protect wallpaper which he has installed himself.

We claim:

1. A washable wallpaper comprising wallpaper coated with a lacquer containing from 60–70% by weight cellulose acetate butyrate having an acetyl content of from 5–18% and butyryl content of above about 35%, 5–15% silica aerogel, 5–25% of an alkyd resin having an acid number not exceeding 2.0 formed from 1,2-propylene glycol, and adipic acid and a solvent mixture containing volatile organic solvents which dissolve all the components of the lacquer.

2. A washable wallpaper comprising wallpaper coated with a lacquer containing from 60–70% by weight cellulose acetate butyrate having an acetyl content of from 5–18% and butyryl content of above about 35%, 5–15% silica aerogel, 5–25% of an alkyd resin having an acid number not exceeding 2.0 formed from 1,2-propylene glycol, and adipic acid and a solvent mixture containing toluene, acetone, ethyl alcohol and naphtha.

3. A method of producing a washable wallpaper comprising coating wallpaper with a lacquer containing from 60–70% by weight cellulose acetate butyrate having an acetyl content of from 5–18% and a butyryl content of above about 35%, 5–15% of silica aerogel, 5–25% of an alkyd resin having an acid number not exceeding 2.0 formed from 1,2-propylene glycol, and adipic acid and a solvent mixture containing volatile organic solvents which dissolve all the components of the lacquer and drying the coating.

4. A method of producing a washable wallpaper comprising coating wallpaper with a lacquer containing from 60–70% by weight cellulose acetate butyrate having an acetyl content of from 5–18% and a butyryl content of above about 35%, 5–15% silica aerogel, 5–25% of an alkyd resin having an acid number not exceeding 2.0 formed from 1,2-propylene glycol, and adipic acid and a solvent mixture containing toluene, acetone, ethyl alcohol and naphtha and drying the coating.

References Cited in the file of this patent

UNITED STATES PATENTS

| | | |
|---|---|---|
| 2,421,001 | Ash | May 27, 1947 |
| 2,423,823 | Baker | July 15, 1947 |
| 2,717,214 | Marotta et al. | Sept. 6, 1955 |